US010677967B1

(12) United States Patent
Ouderkirk et al.

(10) Patent No.: US 10,677,967 B1
(45) Date of Patent: Jun. 9, 2020

(54) FLEXIBLE BORDER ALLOWING VERTICAL TRANSLATION OF MEMBRANE FOR FLUID-FILLED LENS

(71) Applicant: Facebook Technologies, LLC, Menlo Park, CA (US)

(72) Inventors: Andrew John Ouderkirk, Redmond, WA (US); Lu Lu, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 194 days.

(21) Appl. No.: 15/877,256

(22) Filed: Jan. 22, 2018

(51) Int. Cl.
*G02B 3/14* (2006.01)
*G02B 27/00* (2006.01)
*G02B 3/00* (2006.01)

(52) U.S. Cl.
CPC ........... *G02B 3/14* (2013.01); *G02B 27/0025* (2013.01); *G02B 3/0081* (2013.01); *G02B 2003/0093* (2013.01)

(58) Field of Classification Search
CPC ................ G02B 13/143; G02B 26/005; G02B 26/0816; G02B 26/0825; G02B 13/0075; G02B 13/009; G02B 3/14; G02B 26/02; G03F 7/70958; G03F 7/20; Y10S 359/90
See application file for complete search history.

(56) References Cited

U.S. PATENT DOCUMENTS

| 2,836,101 | A | | 5/1958 | Swart | |
|---|---|---|---|---|---|
| 4,261,655 | A | * | 4/1981 | Honigsbaum | G02B 3/12 351/159.41 |
| 6,618,208 | B1 | | 9/2003 | Silver | |
| 7,085,065 | B2 | | 8/2006 | Silver | |
| 7,142,369 | B2 | | 11/2006 | Wu et al. | |
| 7,369,321 | B1 | | 5/2008 | Ren et al. | |
| 8,526,113 | B2 | | 9/2013 | Pugh et al. | |
| 8,817,381 | B2 | | 8/2014 | Gupta et al. | |
| 2006/0164731 | A1 | * | 7/2006 | Wu | G02B 3/14 359/666 |
| 2008/0117521 | A1 | * | 5/2008 | Krupenkin | G02B 3/14 359/665 |
| 2008/0316610 | A1 | * | 12/2008 | Dobrusskin | G02B 3/14 359/666 |
| 2010/0182703 | A1 | * | 7/2010 | Bolis | G02B 3/14 359/666 |

(Continued)

FOREIGN PATENT DOCUMENTS

WO    2008063442 A1    5/2018

OTHER PUBLICATIONS

"Ion Implantation", retrieved from https://matenggroup.wordpress.com/ion-implantation/ and printed on Nov. 6, 2018.

(Continued)

*Primary Examiner* — William R Alexander
*Assistant Examiner* — Balram T Parbadia
(74) *Attorney, Agent, or Firm* — Kilpatrick Townsend & Stockton LLP

(57) ABSTRACT

A flexible border for a liquid lens serves as a transition to allow movement at an edge of a membrane that is part of the liquid lens, thereby reducing distortion caused by the "beam effect" of the membrane securely attached to an anchor point. The flexible border allows vertical translation of an end of a membrane portion.

20 Claims, 11 Drawing Sheets

(56) References Cited

U.S. PATENT DOCUMENTS

| | | | |
|---|---|---|---|
| 2010/0195213 A1* | 8/2010 | Bolis | G02B 26/004 359/666 |
| 2011/0032624 A1* | 2/2011 | Bolis | B81B 3/0021 359/666 |
| 2011/0085131 A1* | 4/2011 | Gupta | G02B 3/14 351/159.6 |
| 2012/0041553 A1* | 2/2012 | Gupta | G02B 3/14 623/6.13 |
| 2012/0170134 A1* | 7/2012 | Bolis | G02B 26/0825 359/666 |
| 2012/0170920 A1* | 7/2012 | Moreau | G02B 3/14 396/72 |
| 2017/0184848 A1* | 6/2017 | Vallius | G02B 3/14 |

OTHER PUBLICATIONS

"Inkjet printing", retrieved from https://en.wikipedia.org/wiki/Inkjet_printing and printed on Nov. 6, 2018.
Stevens et al., "A review of adjustable lenses for head mounted displays", SPIE Symposium, Sep. 12, 2017, 20 pages.
Hasan et al., "Tunable-focus lens for adaptive eyeglasses", Optics Express vol. 25, No. 2, Jan. 23, 2017, 13 pages.

* cited by examiner

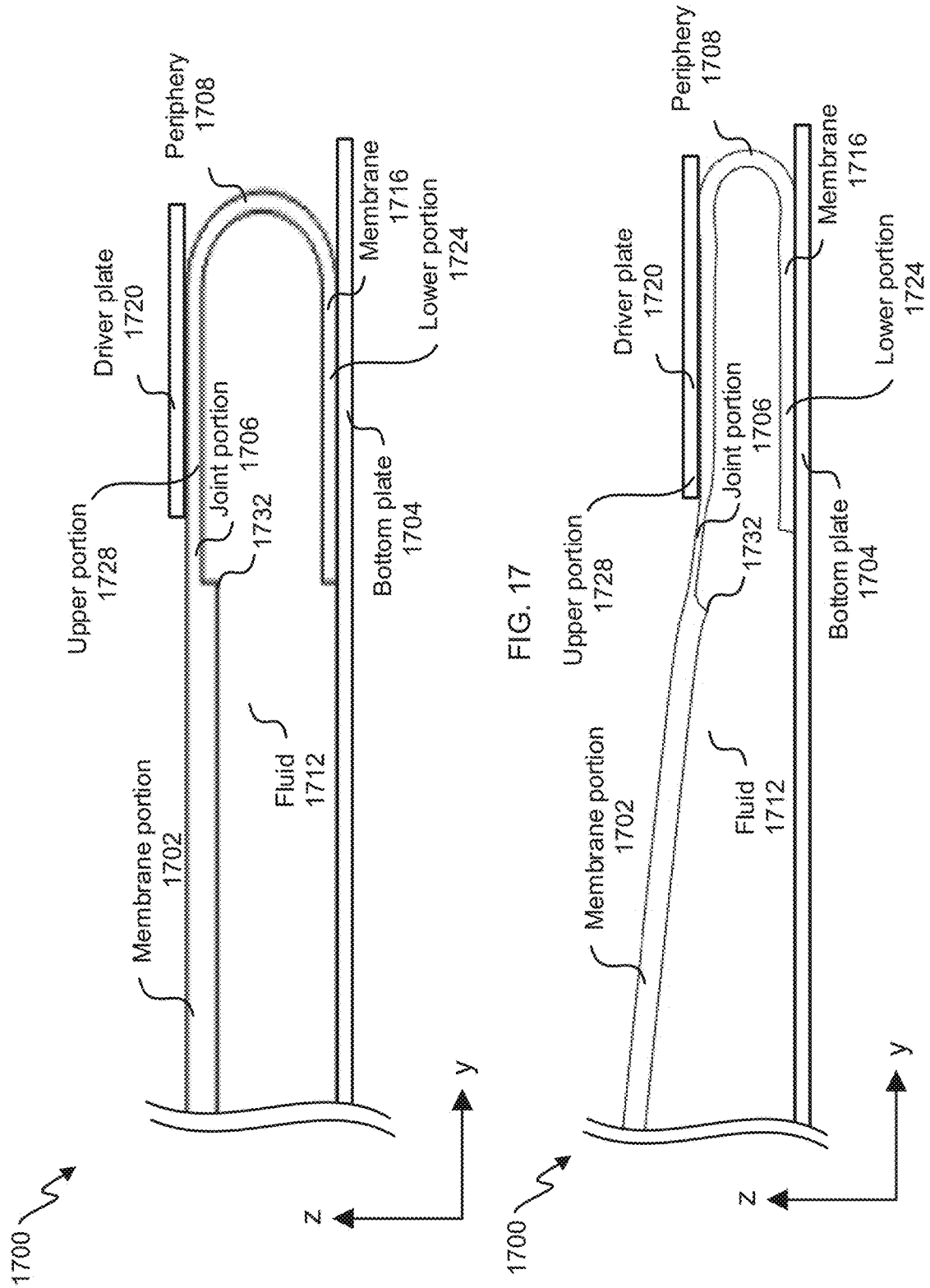

FLEXIBLE BORDER ALLOWING VERTICAL TRANSLATION OF MEMBRANE FOR FLUID-FILLED LENS

BACKGROUND

This disclosure relates generally to near-eye-display systems, and more specifically to waveguide displays with a small form factor, a large field of view, and/or a large eyebox. Near-eye, light-field displays project images directly into a user's eye, encompassing both near-eye displays and electronic viewfinders. Conventional near-eye displays generally have a display element that generates image light that passes through one or more lenses before reaching a user's eyes. Additionally, near-eye displays in virtual-reality (VR) systems and/or augmented-reality (AR) systems have design criteria to be compact, be lightweight, and provide two-dimensional expansion with a large eyebox and a wide field-of-view (FOV). In typical near-eye displays, a limit for the FOV is based on satisfying two physical conditions: (1) an occurrence of total internal reflection of image light coupled into a waveguide, and (2) an existence of a first-order diffraction caused by a diffraction grating. Conventional methods used to satisfy the above two physical conditions rely on heavy and expensive components. Further, designing a conventional near-eye display with two-dimensional expansion involving two different output-grating elements that are spatially separated often results in a large form factor. Accordingly, it is challenging to design near-eye displays using conventional methods to achieve a small form factor, a large FOV, and/or a large eyebox.

SUMMARY

The present disclosure relates generally to liquid lenses for variable focus length. A flexible border for a liquid lens serves as a transition to allow movement at an edge of a membrane that is part of the liquid lens, thereby reducing distortion caused by the "beam effect" of the membrane securely attached to an anchor point.

In some embodiments, a device for use as a liquid lens in an augmented-reality system, the device comprises a substrate; a membrane portion, wherein the membrane portion is flexible; a fluid filling a gap between the substrate and the membrane portion; a periphery confining the fluid within a shape of the periphery; and/or a joint portion, wherein: the joint portion couples the membrane portion with the periphery, and/or the joint portion is configured to allow an end of the membrane portion to move in a translation motion in relation to the periphery. In some embodiments, the joint portion has a serpentine cross section; the translation motion is a vertical motion; vertical is defined in a direction of beam propagation; the joint portion is made of a same material as the membrane portion; the joint portion comprises a metal; the joint portion follows the shape of the periphery; the end of the membrane portion has a non-elliptical shape in a plane orthogonal to beam propagation; the shape of the periphery is non-elliptical; the shape of the periphery includes an edge and a corner; the edge of the periphery is defined by a first radius of curvature, the corner of the periphery is defined by a second radius of curvature, and the first radius of curvature is at least four times the second radius of curvature; a first thickness of the joint portion at the edge is less than a second thickness of the joint portion at the corner; and/or the joint portion has a width defined by a distance from the membrane portion to the periphery, and the width of the joint portion increases as the membrane moves in relation to the periphery.

In some embodiments, a method of using a liquid lens in an augmented-reality system comprises applying pressure to a membrane portion of a liquid lens to move the membrane portion in relation to a periphery of the liquid lens, wherein the liquid lens comprises: a substrate; the membrane portion, wherein the membrane portion is flexible; a fluid filling a gap between the substrate and the membrane portion; the periphery confining the fluid within a shape of the periphery; and a joint portion, wherein: the joint portion couples the membrane with the periphery, and the joint portion is configured to allow the membrane to move in relation to the periphery; moving an end of the membrane portion in a translation motion relative to the periphery using the joint portion based on applying pressure to the membrane portion; and transmitting light through the liquid lens after translating an end of the membrane portion, whereby beam effect is reduced compared to a liquid lens without a joint. In some embodiments the method further comprises moving the membrane portion from a neutral position to decrease a focal length of the liquid lens, and/or increasing a width of the joint portion based on moving the membrane portion from the neutral position to decrease the focal length of the liquid lens. In some embodiments, there is less translation of the end of the membrane portion near a corner of the periphery than at an edge of the periphery because a thickness of the joint portion at the corner of the periphery is greater than a thickness of the joint portion at the edge of the periphery; the joint portion follows the shape of the periphery; and/or the shape of the periphery is non-elliptical.

In some embodiments, a system for augmented reality comprises a frame; a display mounted in the frame; a waveguide in the display; and/or a liquid lens configured to change focus of light exiting the waveguide, the liquid lens comprising: a substrate; a membrane portion, wherein the membrane portion is flexible; a fluid filling a gap between the substrate and the membrane portion; a periphery confining the fluid within a shape of the periphery; and a joint portion, wherein: the joint portion couples the membrane portion with the periphery, and the joint portion is configured to allow an end of the membrane portion to move in a translation motion in relation to the periphery. In some embodiments, the liquid lens is a first liquid lens, the system further comprises a second liquid lens, and the second liquid lens is configured to counteract effects of the first liquid lens for an object imaged on an opposite side of the display in relation to a user's eye; the joint portion follows the shape of the periphery; and/or the shape of the periphery is non-elliptical.

BRIEF DESCRIPTION OF THE DRAWINGS

Illustrative embodiments are described with reference to the following figures.

FIG. 17 illustrates a cross section of another embodiment of a jointed lens.

FIG. 18 illustrates the jointed lens in FIG. 17 with a compressed periphery.

Figure 1:
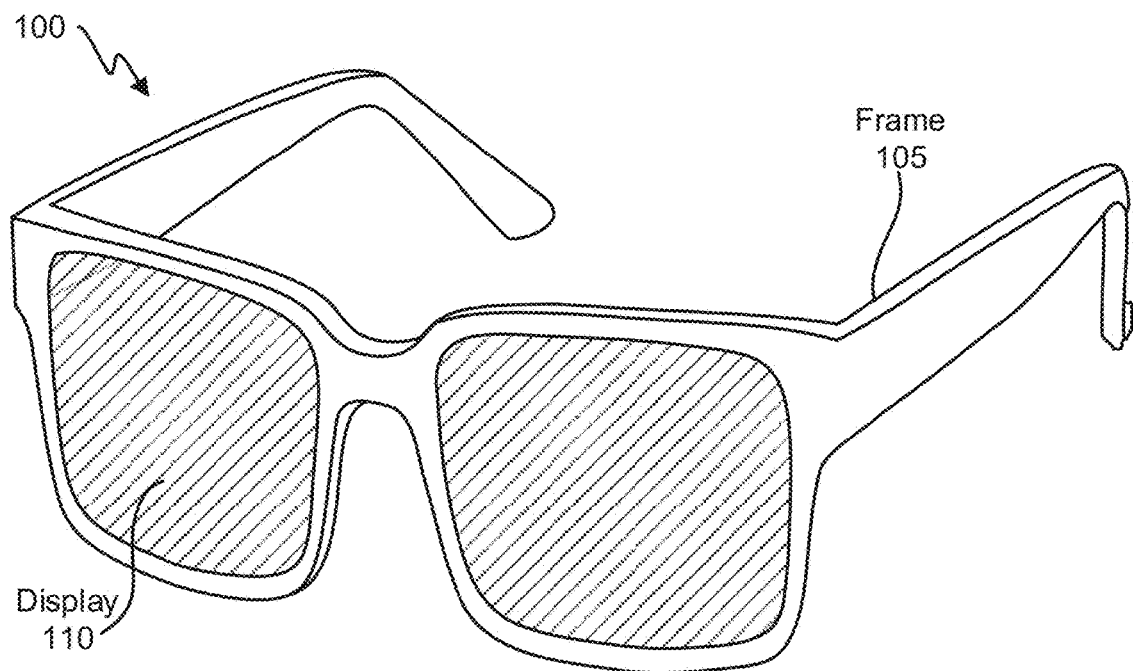
FIG. 1 is a diagram of an embodiment of a near-eye display.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

This disclosure relates generally liquid lenses with a variable focal length. More specifically, and without limitation, this disclosure relates to the use of a flexible border for a liquid lens to allow variable vertical displacement at the boundary, to accommodate a non-circular (e.g., rectangular) frame. A liquid lens refers to an optical element comprising a clear, flexible membrane containing a liquid. Generally speaking, the three-dimensional shape of a liquid lens is circularly symmetric. If the lens has a circular boundary, the vertical height of the lens remains constant along that boundary. However, the shape of eyewear (and/or head-mounted display (HMD)) frames may not always be circular. Whether influenced by fashion or practical considerations, or a combination thereof, the shape of the eyewear frame may be rectangular, trapezoidal, or otherwise non-circular in nature. The non-circular shape of the frame cuts a non-circular boundary for the lens. For a circularly symmetric lens, this means the vertical height of the lens will rise and fall along the non-circular boundary. If the non-circular frame is rigid and does not allow vertical displacement, the liquid lens and its optics will distort in an unintended manner.

The present disclosure introduces a flexible border for the liquid lens to allow variable vertical displacement to combat such distortion. In one embodiment, the flexible border may be formed from a portion of the membrane of the liquid lens. For example, a "serpentine" curve (from a cross-sectional view) may be formed in the membrane at the boundary of the liquid lens. The material of the membrane itself has a certain resistance to bending. By introducing the serpentine curve, bending of the membrane is extended over a greater length of the membrane material, which eases movement of the membrane. In particular, vertical movement is accommodated. Thus, the serpentine curve allows the membrane to move up and down at the boundary in order to maintain the circularly symmetric three-dimensional shape of the liquid lens, while remaining attached to the non-circular (e.g., rectangular) frame. Such a flexible boundary can therefore substantially reduce or eliminate optical distortions associated with attachment of the liquid lens to the non-circular frame.

Note that the flexible border allows a variable vertical displacement along the boundary of the liquid lens. For example, at a location along the boundary where the vertical displacement is greater, the serpentine curve may be formed to have a larger amplitude or have a greater number of s-curves. At a location along the boundary where the vertical displacement is less, the serpentine curve may be formed to have a smaller amplitude or have a fewer number of s-curves. Other properties may also be varied accordingly, such as the membrane's thickness, composition, etc., to effectuate the variation in the vertical displacement.

A flexible boundary having a cross-sectional serpentine shape and formed as a part of the membrane of the liquid lens is merely one illustrative embodiment. In some embodiments, shapes other than a "serpentine" may be used. For example, a cross-sectional shape resembling a triangular wave, rectangular wave, etc., may be used. Also, the flexible border may be made from a different material, e.g., a metal.

FIG. 1 is a diagram of an embodiment of a near-eye display 100. The near-eye display 100 presents media to a user. Examples of media presented by the near-eye display 100 include one or more images, video, and/or audio. In some embodiments, audio is presented via an external device (e.g., speakers and/or headphones) that receives audio information from the near-eye display 100, a console, or both, and presents audio data based on the audio information. The near-eye display 100 is generally configured to operate as a virtual reality (VR) display. In some embodiments, the near-eye display 100 is modified to operate as an augmented reality (AR) display and/or a mixed reality (MR) display.

The near-eye display 100 includes a frame 105 and a display 110. The frame 105 is coupled to one or more optical elements. The display 110 is configured for the user to see content presented by the near-eye display 100. In some embodiments, the display 110 comprises a waveguide display assembly for directing light from one or more images to an eye of the user.

Figure 2:
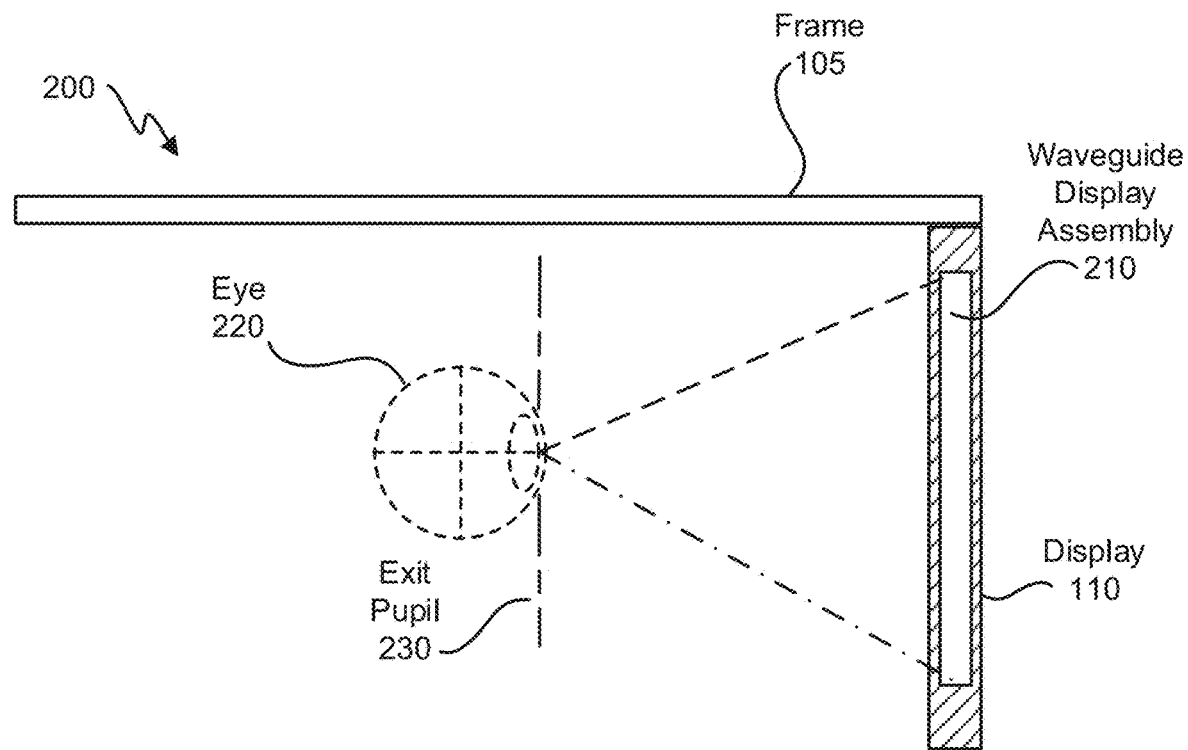
FIG. 2 is an embodiment of a cross section of the near-eye display.

FIG. 2 is an embodiment of a cross section 200 of the near-eye display 100 illustrated in FIG. 1. The display 110 includes at least one waveguide display assembly 210. An exit pupil 230 is a location where the eye 220 is positioned in an eyebox region when the user wears the near-eye display 100. For purposes of illustration, FIG. 2 shows the cross section 200 associated with a single eye 220 and a single waveguide display assembly 210, but a second waveguide display is used for a second eye of a user.

The waveguide display assembly 210 is configured to direct image light to an eyebox located at the exit pupil 230 and to the eye 220. The waveguide display assembly 210 may be composed of one or more materials (e.g., plastic, glass, etc.) with one or more refractive indices. In some embodiments, the near-eye display 100 includes one or more optical elements between the waveguide display assembly 210 and the eye 220.

In some embodiments, the waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g. multi-planar colored display). In some configurations, the stacked waveguide display is a monochromatic display that can be projected on multiple planes (e.g. multi-planar monochromatic display). The varifocal waveguide display is a display that can adjust a focal position of image light emitted from the waveguide display. In alternate embodiments, the waveguide display assembly 210 may include the stacked waveguide display and the varifocal waveguide display.

Figure 3:
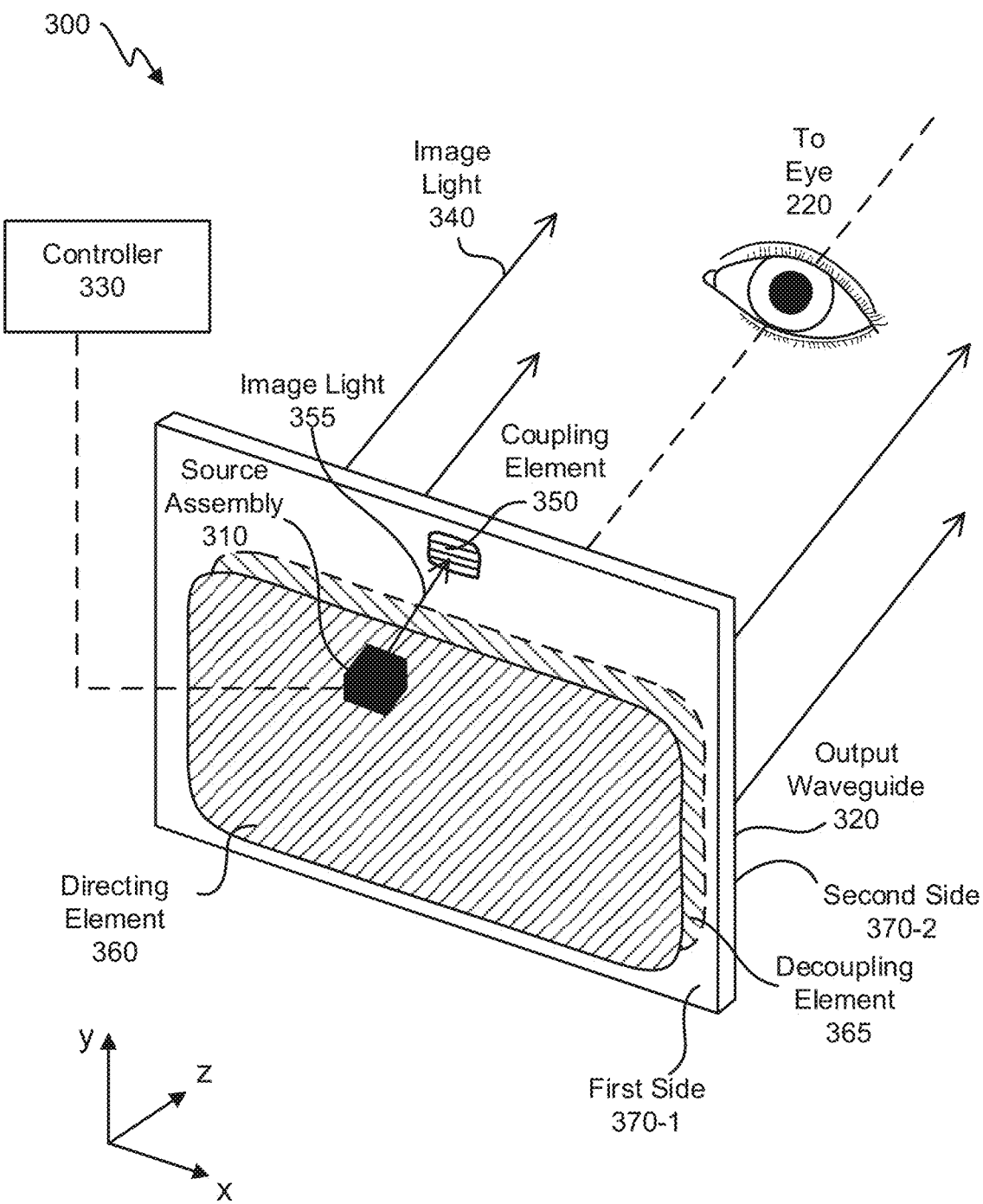
FIG. 3 illustrates an isometric view of an embodiment of a waveguide display with a single source assembly.

FIG. 3 illustrates an isometric view of an embodiment of a waveguide display 300. In some embodiments, the waveguide display 300 is a component (e.g., the waveguide display assembly 210) of the near-eye display 100. In some embodiments, the waveguide display 300 is part of some other near-eye display or other system that directs image light to a particular location.

The waveguide display 300 includes a source assembly 310, an output waveguide 320, and a controller 330. For purposes of illustration, FIG. 3 shows the waveguide display 300 associated with a single eye 220, but in some embodiments, another waveguide display separate, or partially separate, from the waveguide display 300 provides image light to another eye of the user.

The source assembly 310 generates image light 355. The source assembly 310 generates and outputs the image light 355 to a coupling element 350 located on a first side 370-1 of the output waveguide 320. The output waveguide 320 is an optical waveguide that outputs expanded image light 340 to an eye 220 of a user. The output waveguide 320 receives the image light 355 at one or more coupling elements 350 located on the first side 370-1 and guides received input image light 355 to a directing element 360. In some embodiments, the coupling element 350 couples the image light 355 from the source assembly 310 into the output waveguide 320. The coupling element 350 may be, e.g., a diffraction grating, a holographic grating, one or more cascaded reflectors, one or more prismatic surface elements, and/or an array of holographic reflectors.

The directing element 360 redirects the received input image light 355 to the decoupling element 365 such that the received input image light 355 is decoupled out of the output waveguide 320 via the decoupling element 365. The directing element 360 is part of, or affixed to, the first side 370-1 of the output waveguide 320. The decoupling element 365 is part of, or affixed to, the second side 370-2 of the output waveguide 320, such that the directing element 360 is opposed to the decoupling element 365. The directing element 360 and/or the decoupling element 365 may be, e.g., a diffraction grating, a holographic grating, one or more cascaded reflectors, one or more prismatic surface elements, and/or an array of holographic reflectors.

The second side 370-2 represents a plane along an x-dimension and a y-dimension. The output waveguide 320 may be composed of one or more materials that facilitate total internal reflection of the image light 355. The output waveguide 320 may be composed of e.g., silicon, plastic, glass, and/or polymers. The output waveguide 320 has a relatively small form factor. For example, the output waveguide 320 may be approximately 50 mm wide along x-dimension, 30 mm long along y-dimension and 0.5-1 mm thick along a z-dimension.

The controller 330 controls scanning operations of the source assembly 310. The controller 330 determines scanning instructions for the source assembly 310. In some embodiments, the output waveguide 320 outputs expanded image light 340 to the user's eye 220 with a large field of view (FOV). For example, the expanded image light 340 provided to the user's eye 220 with a diagonal FOV (in x and y) of 60 degrees and or greater and/or 150 degrees and/or less. The output waveguide 320 is configured to provide an eyebox with a length of 20 mm or greater and/or equal to or less than 50 mm, and/or a width of 10 mm or greater and/or equal to or less than 50 mm.

Figure 4:
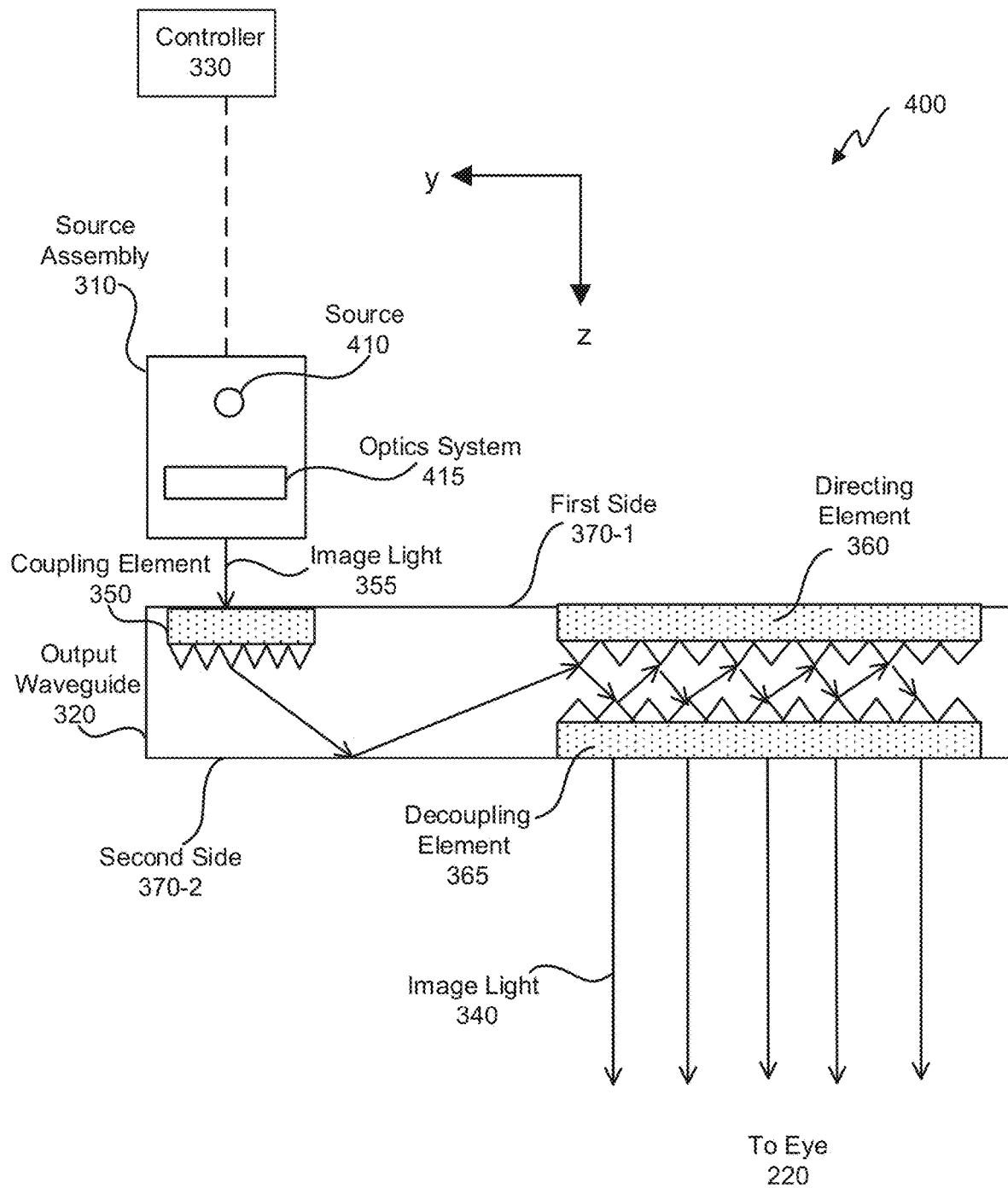
FIG. 4 illustrates a cross section of an embodiment of the waveguide display.

FIG. 4 illustrates an embodiment of a cross section 400 of the waveguide display 300. The cross section 400 includes the source assembly 310 and the output waveguide 320. The source assembly 310 generates image light 355 in accordance with scanning instructions from the controller 330. The source assembly 310 includes a source 410 and an optics system 415. The source 410 is a light source that generates coherent or partially coherent light. The source 410 may be, e.g., a laser diode, a vertical cavity surface emitting laser, and/or a light emitting diode.

The optics system 415 includes one or more optical components that condition the light from the source 410. Conditioning light from the source 410 may include, e.g., expanding, collimating, and/or adjusting orientation in accordance with instructions from the controller 330. The one or more optical components may include one or more lens, liquid lens, mirror, aperture, and/or grating. In some embodiments, the optics system 415 includes a liquid lens with a plurality of electrodes that allows scanning a beam of light with a threshold value of scanning angle to shift the beam of light to a region outside the liquid lens. Light emitted from the optics system 415 (and the source assembly 310) is referred to as image light 355.

The output waveguide 320 receives the image light 355. The coupling element 350 couples the image light 355 from the source assembly 310 into the output waveguide 320. In embodiments where the coupling element 350 is diffraction grating, a pitch of the diffraction grating is chosen such that total internal reflection occurs in the output waveguide 320, and the image light 355 propagates internally in the output waveguide 320 (e.g., by total internal reflection), toward the decoupling element 365.

The directing element 360 redirects the image light 355 toward the decoupling element 365 for decoupling from the output waveguide 320. In embodiments where the directing element 360 is a diffraction grating, the pitch of the diffraction grating is chosen to cause incident image light 355 to exit the output waveguide 320 at angle(s) of inclination relative to a surface of the decoupling element 365.

In some embodiments, the directing element 360 and/or the decoupling element 365 are structurally similar. The expanded image light 340 exiting the output waveguide 320 is expanded along one or more dimensions (e.g., may be elongated along x-dimension). In some embodiments, the waveguide display 300 includes a plurality of source assemblies 310 and a plurality of output waveguides 320. Each of the source assemblies 310 emits a monochromatic image light of a specific band of wavelength corresponding to a primary color (e.g., red, green, or blue). Each of the output waveguides 320 may be stacked together with a distance of separation to output an expanded image light 340 that is multi-colored.

Figure 5:
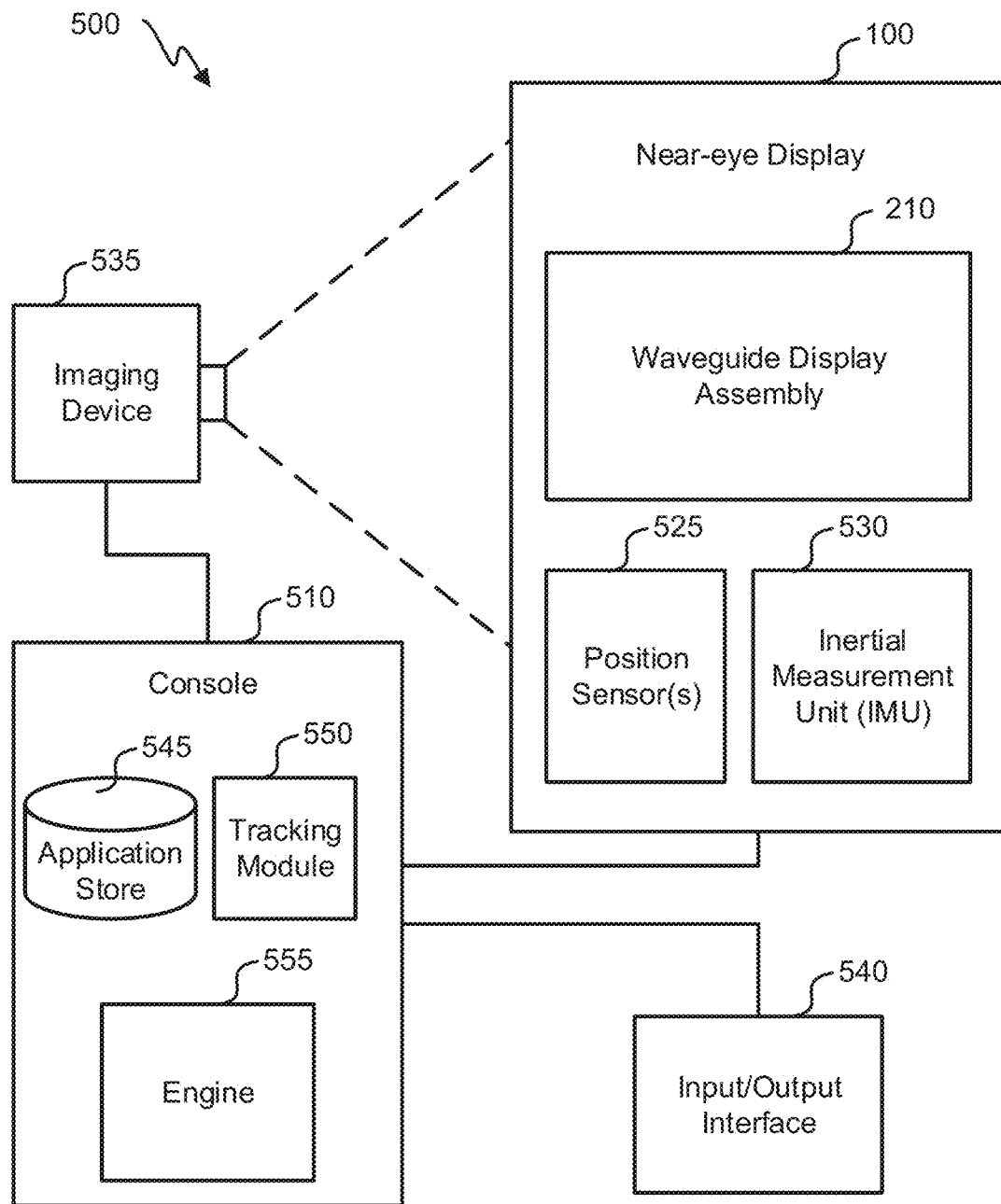
FIG. 5 is a block diagram of an embodiment of a system including the near-eye display.

FIG. 5 is a block diagram of an embodiment of a system 500 including the near-eye display 100. The system 500 comprises the near-eye display 100, an imaging device 535, and an input/output interface 540 that are each coupled to a console 510.

The near-eye display 100 is a display that presents media to a user. Examples of media presented by the near-eye display 100 include one or more images, video, and/or audio. In some embodiments, audio is presented via an external device (e.g., speakers and/or headphones) that receives audio information from the near-eye display 100 and/or the console 510 and presents audio data based on the audio information to a user. In some embodiments, the near-eye display 100 may also act as an AR eyewear glass. In some embodiments, the near-eye display 100 augments views of a physical, real-world environment, with computer-generated elements (e.g., images, video, sound, etc.).

The near-eye display 100 includes a waveguide display assembly 210, one or more position sensors 525, and/or an inertial measurement unit (IMU) 530. The waveguide display assembly 210 includes the source assembly 310, the output waveguide 320, and the controller 330.

The IMU 530 is an electronic device that generates fast calibration data indicating an estimated position of the near-eye display 100 relative to an initial position of the near-eye display 100 based on measurement signals received from one or more of the position sensors 525.

The imaging device 535 generates slow calibration data in accordance with calibration parameters received from the console 510. The imaging device 535 may include one or more cameras and/or one or more video cameras.

The input/output interface 540 is a device that allows a user to send action requests to the console 510. An action request is a request to perform a particular action. For example, an action request may be to start or end an application or to perform a particular action within the application.

The console 510 provides media to the near-eye display 100 for presentation to the user in accordance with information received from one or more of: the imaging device 535, the near-eye display 100, and the input/output interface 540. In the example shown in FIG. 5, the console 510 includes an application store 545, a tracking module 550, and an engine 555.

The application store 545 stores one or more applications for execution by the console 510. An application is a group of instructions, that when executed by a processor, generates content for presentation to the user. Examples of applications include gaming applications, conferencing applications, video playback application, or other suitable applications.

The tracking module 550 calibrates the system 500 using one or more calibration parameters and may adjust one or more calibration parameters to reduce error in determination of the position of the near-eye display 100.

The tracking module 550 tracks movements of the near-eye display 100 using slow calibration information from the imaging device 535. The tracking module 550 also determines positions of a reference point of the near-eye display 100 using position information from the fast calibration information.

The engine 555 executes applications within the system 500 and receives position information, acceleration information, velocity information, and/or predicted future positions of the near-eye display 100 from the tracking module 550. In some embodiments, information received by the engine 555 may be used for producing a signal (e.g., display instructions) to the waveguide display assembly 210 that determines a type of content presented to the user.

Figure 6:
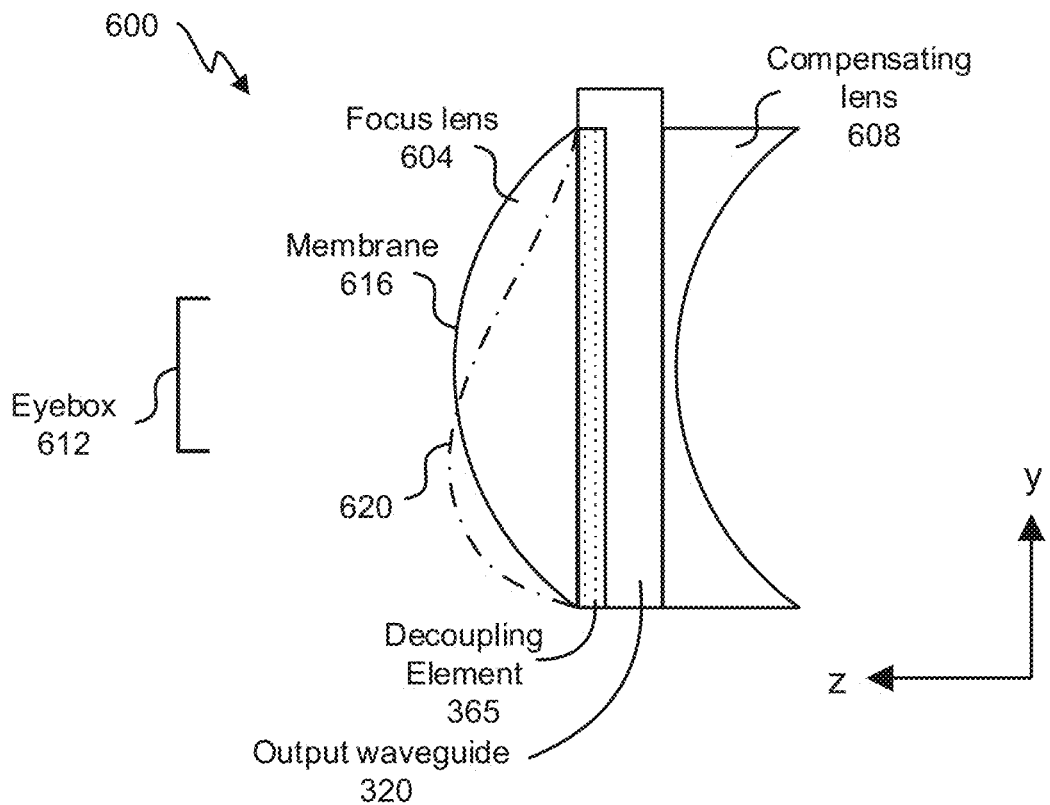
FIG. 6 illustrates a simplified diagram of an embodiment of a liquid lens system used in an augmented-reality system.

FIG. 6 illustrates a simplified diagram of an embodiment of a liquid lens used in an augmented-reality system. FIG. 6 depicts a lens system 600. The lens system 600 comprises the output waveguide 320, the decoupling element 365, a focus lens 604, and a compensating lens 608. Light is emitted from the decoupling element 365, through the focus lens 604, and to an eyebox 612. The eyebox 612 is at the exit pupil 230. The eyebox 612 is a usable area of light output from the decoupling element 365 at the exit pupil 230.

Many optical systems use refractive optical elements to change focus or to magnify an image. Optical elements usually have a fixed optical power, and there is need in many applications for a variable optical power. There are several approaches to make a lens with a variable optical power. One approach is to use a "liquid lens." A liquid lens has a membrane that is transparent and flexible. A space or gap separates the membrane from a substrate. The substrate is transparent and rigid. The space or gap is filled with a transparent fluid, commonly a silicone or organic fluid, preferably made of a material with high transmission and high refractive index. A focal length of the liquid lens is changed by moving sides of the liquid lens, by increasing or decreasing fluid in the liquid lens, and/or by increasing or decreasing pressure of fluid in the liquid lens.

In cases where the lens system 600 is mounted with its optical axis in an approximately horizontal direction, gravity can distort the lens. Distortion due to gravity and other inertial effects is proportional to $d^5/t^3$, where d is a diameter of the lens and t is a thickness of the membrane. For large lenses, particularly for lenses used to augment human vision, thicker membranes are used to reduce distortion to the lens.

In a liquid lens, edges of the membrane are usually constrained. This creates a potential compromise in performance. While thicker membranes improve the resistance of gravity and inertial effects distorting the lens, optical distortion near edges (referred to as the beam effect) also increase as $t^3$. Therefore, there is a need to reduce lens distortion due to gravity and inertial effects without creating significant optical distortion due to the beam effect from using a thicker membrane.

The focus lens 604 is a liquid lens. The compensating lens 608 is a liquid lens. The liquid lens of the focus lens 604 comprises a membrane 616. The focus lens 604 is used to change focus of light emitted from the decoupling element 365. Normally, light emitted from the decoupling element 365 is set to image at infinity (a person of skill in the art will recognize that infinity is referring to infinity focus of a lens and/or lens system). For augmented reality, light emitted from the decoupling element 365 has a change in focus to simulate three-dimensional viewing. For example, to simulate a bird landing in a user's hand, an image of the bird is projected through the output waveguide 320 and through the decoupling element 365 to the eyebox 612. The focus lens 604 is used to change the focus of the image of the bird so that the bird appears closer to the user (e.g., about 0.75 meters away from the user's eye) than at infinity.

The compensating lens 608 is used to at least partially reverse the effects of the focus lens 604 for objects beyond the lens system 600. Thus image light 340 (e.g., the bird) is focused and light from objects beyond the lens system 600 (e.g., the user's hand) is not materially changed by the lens system 600. In some embodiments, a focal length of the compensating lens 608 is changed in negative proportion to a change in focal length of the focus lens 604. In some embodiments, the compensating lens 608 is on the same side of the near-eye display 100 as the focus lens 604 (e.g., both the compensating lens 608 and the focus lens 604 are on one side of an optical substrate that provides rigid support for the near-eye display). In some embodiments, two focus lenses are used, one focus lens on each side; and one or two corrective lenses are used. In some embodiments, a corrective lens is on at least one side of the output waveguide 320.

If the membrane 616 of the focus lens 604 is too thin, the membrane 616 will deform. A dashed line 620 shows an embodiment of an outline of a membrane that is deformed due to gravity. Thus a thickness of the membrane 616 is increased to reduce distortion due to gravity. However, increasing the thickness of the membrane 616 can increase optical distortion, as described in conjunction with FIG. 7.

Figure 7:
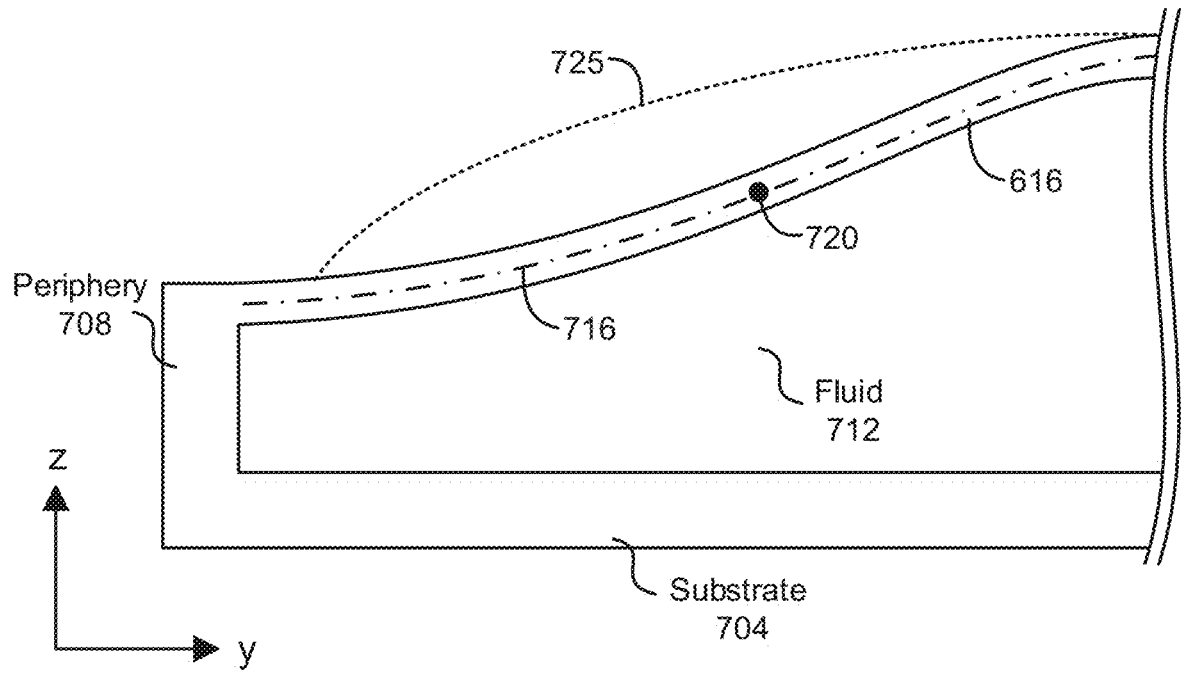
FIG. 7 illustrates a cross section of an embodiment of a liquid lens without a joint.

FIG. 7 illustrates a cross section of an embodiment of a liquid lens without a joint. FIG. 7 shows a portion of the liquid lens. The liquid lens comprises the membrane 616, a substrate 704, and a periphery 708. Fluid 712 fills a space between the substrate 704 and the membrane 616. The periphery 708 circumscribes the fluid 712 to confine the fluid 712 within a shape of the periphery 708 (e.g., the periphery 708 confines the fluid 712 within the shape, wherein the shape is defined in an x/y plane). In some embodiments, the periphery 708 is of the same material as the membrane 616 and/or the substrate 704. In some embodiments, the periphery 708 is bond material bonding the membrane 616 to the substrate 704. In some embodiments, the periphery 708 is movably coupled with the substrate 704 (e.g., so that the periphery 708 can move in the z-direction to change a focal length of the liquid lens).

The membrane 616, the substrate 704, and or the fluid 712 are transparent (e.g., allowing light to pass through so that objects behind can be distinctly seen). The substrate 704 is in an x/y plane. A direction normal to the substrate 704, the z-axis, is the optical axis. Directions along the x-axis and/or y-axis are transverse directions. The periphery 708 confines the fluid 712 in transverse directions. The substrate 704 and/or the membrane 616 confine the fluid 712 in the z-axis direction. The periphery 708 circumscribes the fluid 712 in the x/y plane.

The membrane 616 follows a first curve 716 because of being coupled to the periphery 708. The first curve 716 has an inflection point 720 where a change in a direction of curvature of membrane 616 occurs. The change in curvature of the membrane 616 causes optical distortion near the periphery 708 of the liquid lens.

By contrast, a simple curve 725 (a second curve) is shown as a dashed line. If the membrane 616 followed more closely the simple curve 725, the liquid lens would have less optical distortion near the periphery 708 of the liquid lens.

The "beam effect" refers to an undesirable cross-sectional shape of the membrane 616, which occurs when a curvature of the membrane 616 deviates from the simple curve 725 due to a border of the membrane 616 being fixedly coupled with a frame (e.g., the membrane 616 fixedly coupled to the periphery 708 following an outline of the display 110 in the frame 105). As the fluid 712 fills the liquid lens (or as force is applied to increase internal pressure of the lens), the membrane 616 deforms and the shape of the liquid lens changes to effectuate a different optical power. In some embodiments, as the membrane 616 deforms, the membrane 616 takes on a shape of a specified lens (e.g., a spherical lens). For example, a cross section of the specified lens may resemble the simple curve 725. However, because the membrane 616 is fixedly anchored to the periphery 708, the cross section of the membrane 616 is a more complex curve (e.g., the first curve 716 having an inflection point 720) instead of the simple curve 725.

Figure 8:
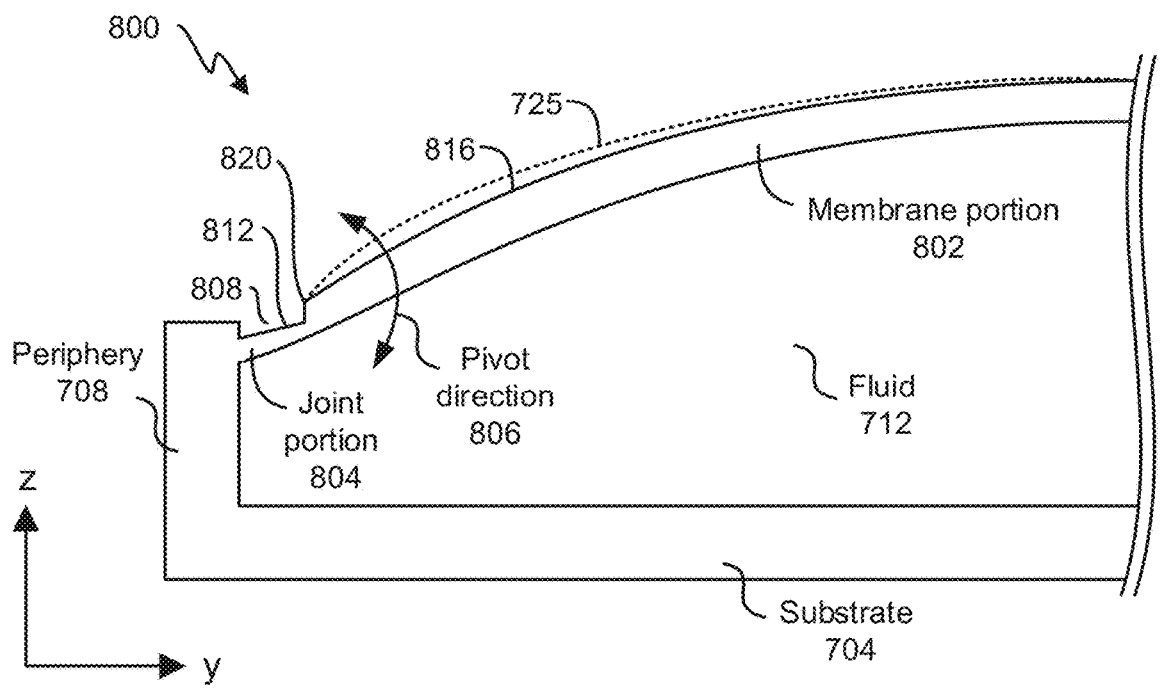
FIG. 8 illustrates a cross section of an embodiment of a jointed lens.

FIG. 8 illustrates a cross section of an embodiment of a jointed lens 800. The jointed lens 800 comprises the substrate 704, the periphery 708, the fluid 712, a membrane portion 802, and a joint portion 804. The membrane portion 802 is flexible (e.g., to change optical power as pressure of the fluid 712 is increased or decreased). The joint portion 804 allows the membrane portion 802 to pivot 806 with respect to the periphery 708 so that the membrane portion 802 makes a shape more similar to the simple curve 725. In some embodiments, the joint portion 804 is configured to allow the membrane portion 802 to move in relation to the periphery 708 to a greater degree than the membrane portion 802 being directly coupled to the periphery 708. The joint portion 804 is configured to allow the membrane portion 802 to move in relation to the periphery 708 to a greater degree than the membrane portion 802 is flexible.

In some embodiments, the joint portion 804 is made by forming a notch 808 in the membrane 616. The notch 808 reduces the beam effect by not having the membrane portion 802 fully constrained to the periphery 708. The notch 808 is defined by an upper surface 812 of the joint portion 804. The membrane portion 802 has an upper surface 816. A discontinuity 820 separates the upper surface 812 of the joint portion 804 from the upper surface 816 of the membrane portion 802. The discontinuity 820 is between the upper surface 816 of the membrane portion 802 and the periphery 708. The discontinuity 820 is a distinct change to a surface of the membrane portion 802 (e.g., in this case the distinct change is to the upper surface 816 of the membrane portion 802). In some embodiments, the upper surface 816 of the membrane portion 802 is defined by a discontinuity 820.

In some embodiments, the joint portion 804 is referred to as a flexible border. From a cross-sectional view, the flexible border allows the membrane portion 802 to be coupled with, yet be capable of rotational movement about, an anchor point (e.g., periphery 708). This substantially reduces or eliminates the optical distortion caused by the first curve 716 because the membrane portion 802 is not anchored at a fixed angle to the periphery 708. The beam effect is thus effectively diminished. In some embodiments, the first curve 716 is referenced to as an s-curve.

In some embodiments, the flexible border comprises the same material as the membrane portion 802. In some embodiments, the flexible border is formed by simply creating the notch 808 in the membrane 616 (e.g., by removing a portion of the membrane 616), close to the anchor point along the boundary of the membrane 616. The notch 808 relieves the stresses caused by rotational motion as the membrane portion 802 deforms to effectuate a different optical power.

The membrane portion 802 is at least partially constrained at the periphery 708. The membrane portion 802 has an average thickness. The joint portion 804 has a minimum thickness. The minimum thickness of the joint portion 804 is between 20% and 80% of the average thickness of the membrane portion 802 (e.g., 20%, 40%, or 60%). The membrane portion 802 is flexible and/or elastic. In some embodiments, the membrane portion 802 is made from silicone, thermoset polyurethane, thermoplastic polyurethane, fluorosilane, and/or natural rubber.

In some embodiments, the joint portion 804 is defined by a width, a length, and a thickness. The width is a distance between the periphery 708 and the membrane portion 802. The length follows a shape of the periphery 708, and the thickness is a minimum distance between a first side of the joint portion 804 and a second side of the joint portion 804. In some embodiments, the width of the joint portion 804 is between 0.2 and 2.0 mm and/or between 1.0 and 1.75 mm. In some embodiments, the width of the joint portion 804 is constant around the shape of the periphery.

Figure 9:
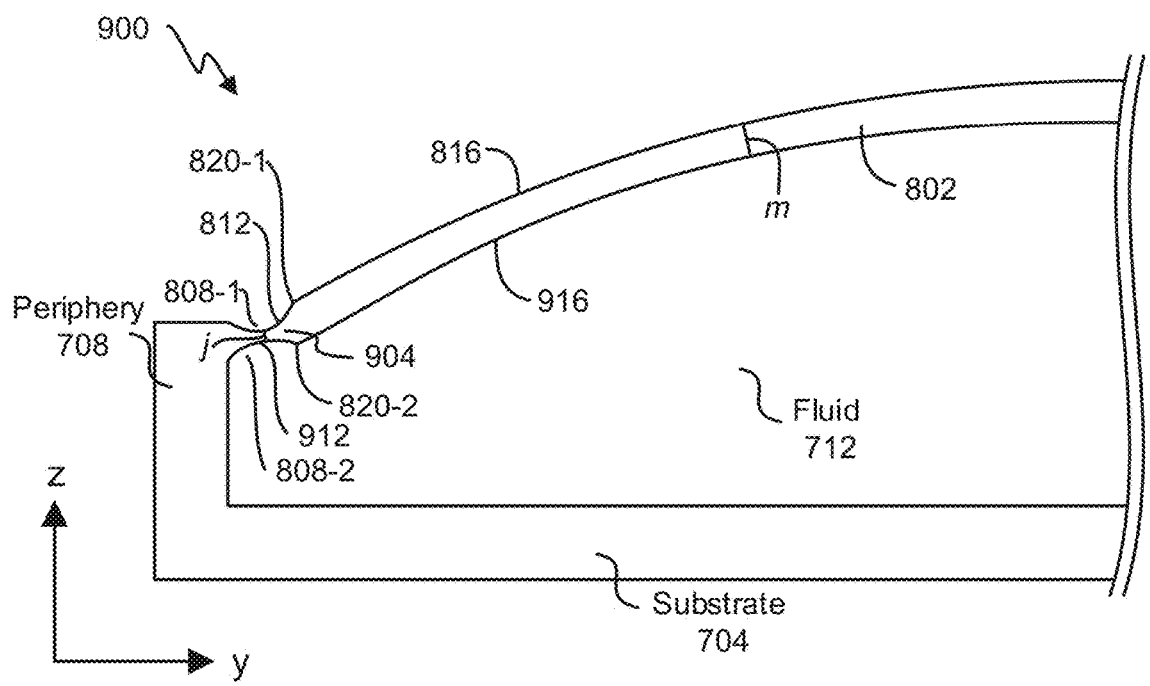
FIG. 9 illustrates a cross section of another embodiment of a jointed lens.

FIG. 9 illustrates a cross section of another embodiment of a jointed lens 900. The jointed lens 900 comprises the substrate 704, the periphery 708, the membrane portion 802, and the fluid 712 between the membrane portion 802 and the substrate 704. The jointed lens 900 comprises a joint portion 904 between the periphery 708 and the membrane portion 802. The joint portion 904 comprises an upper surface 812 defining a first notch 808-1. The upper surface 812 of the joint portion 904 is distinguished from the upper surface 816 of the membrane portion 802 by a first discontinuity 820-1.

The joint portion 904 comprises a lower surface 912. The lower surface 912 of the joint portion 904 defines a second notch 808-2. The lower surface 912 of the joint portion 904 is distinguished from a lower surface 916 of the membrane portion 802 by a second discontinuity 820-2. The second notch 808-2 is formed by removing a portion of the lower surface 916 of the membrane 616. Thus, joint portion 904 is formed by the making the first notch 808-1 in a first surface (external side) of the membrane 616 and making the second notch 808-2 in a second surface (internal side; fluid side) of the membrane 616.

The use of "lower" and "upper" are for convenience in relation to the substrate 704 for distinguishing different surfaces. The use of "lower" and "upper" are not meant to imply absolute orientation or position of the lens system 600. In some embodiments, an upper surface or lower surface is referred to as a first surface, a second surface, a third surface, etc.

In some embodiments, the joint portion 804 is connected to a middle of the membrane portion 802 (e.g., between the upper surface 816 and the lower surface 916). The joint portion 804 is connected to the middle of the membrane portion 802 to minimize distortion of the membrane portion 802 as pressure is applied to the membrane portion 802. In some embodiments, the joint portion 804 is connected to the upper surface 816 and/or the lower surface 916 to cause beneficial distortion to the membrane portion 802. For example, as the near-eye display 100 is worn by a user, gravity is in the −y direction, which can cause the membrane 616 to deform as shown by dashed line 620 in FIG. 6. To at least partially counteract deformation caused distortion due to gravity, the joint portion 804 near a top of the waveguide display 300 (e.g., top being defined in the y direction while the near-eye display 100 is worn by the user) is attached to the upper surface 816 of the membrane portion 802 and/or the joint portion 804 near a bottom of the waveguide display 300 is attached to the lower surface 916 of the membrane portion 802. In some embodiments, the joint portion 804 is attached to the lower surface 916 of the membrane portion 802 to minimize a total height of the membrane portion 802 while the membrane portion is flexed. In some embodiments, the joint portion 804 is connected to the lower surface 916 near a corner 1004 (e.g., to restrict movement); connected to the upper surface 816 near an edge 1008 (e.g., to allow greater movement); and/or connected to the middle of the membrane portion 802 between the corner 1004 and the edge 1008 (e.g., using a smooth function to transition from the upper surface 816 to the lower surface 916).

The membrane portion 802 has a thickness m. Thickness m is a distance between the upper surface 816 of the membrane portion 802 and the lower surface 916 of the membrane portion 802. In some embodiments, the thickness m is an average thickness of the membrane portion 802. The joint portion 904 has a thickness j. Thickness j is a minimum thickness of the joint portion 904 at a given cross section of the joint portion (e.g., measured from the upper surface 812 of the joint portion 904 to the lower surface 912 of the joint portion 904).

Figure 10:
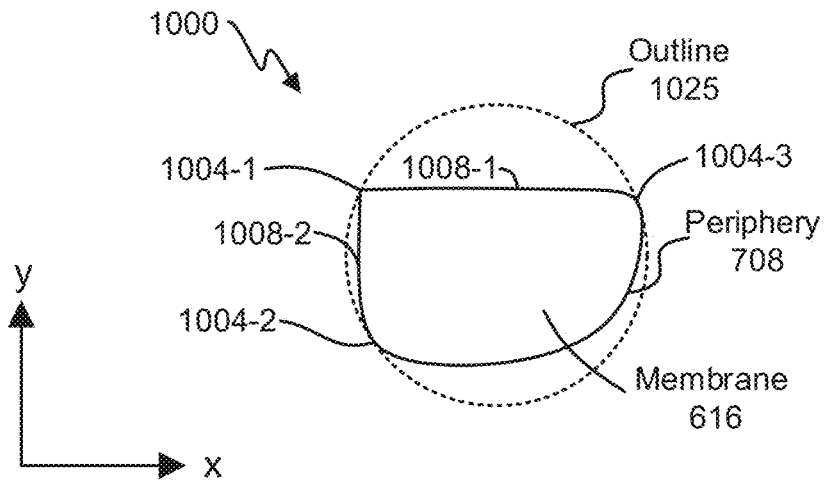
FIG. 10 is a top view of an embodiment of a non-circular lens.

FIG. 10 is a top view of an embodiment of a non-circular lens 1000. The display 110 in the frame 105 may not be circular for a variety of reasons (e.g., style). Thus the periphery 708, in some embodiments, is non-circular and/or non-elliptical in the x/y plane. However, spherical lenses provide better focusing than other lens shapes. To provide a closer approximation to a spherical lens using a non-circular periphery 708, the joint portion 804 has varying flexibility (e.g., less flexibility, more constraint, in corners; and/more flexibility, less constraint on edges). The varying flexibility allows more liftoff near edges and less near corners.

FIG. 10 shows the periphery 708 in a shape in the x/y plane. The x/y plane is orthogonal to a direction of beam propagation (beam propagation is along the z-axis). The shape is of a non-circular and/or non-elliptical lens. The shape comprises corners 1004 and edges 1008. A first corner 1004-1, a second corner 1004-2, a third corner 1004-3, a first edge 1008-1, and a second edge 1008-2 are identified. In some embodiments, the corners 1004 are curved. In some embodiments, the periphery 708 is in a shape of the display 110. In some embodiments, the corner 1004 has a first radius of curvature r1 and the edge 1008 has a second radius of curvature r2. In some embodiments, r2>4*r1; and/or r2>10*r1. In some embodiments, r2 is infinite (corresponding to a portion of the edge 1008 that is straight). In some embodiments, the joint portion 804 follows the shape of the periphery 708.

An outline 1025 of a circle is shown. The outline 1025 of the circle touches the first corner 1004-1, the second corner 1004-2, and the third corner 1004-3. The outline 1025 does not touch the first edge 1008-1 or the second edge 1008-2. For the membrane portion 802 to mimic a spherical lens, the membrane portion 802 has a peak (most movement in the z direction) near a center of the outline 1025 and the least movement at the outline 1025 of the circle. Thus the membrane portion 802 is more constrained at the corners 1004 and less constrained at the edges 1008. To provide more constraint at the corners 1004, the thickness j of the joint portion 804 is thicker near the corners. The joint portion 804 has varying thickness j as a function of position along the shape of the periphery 708.

Figure 11:
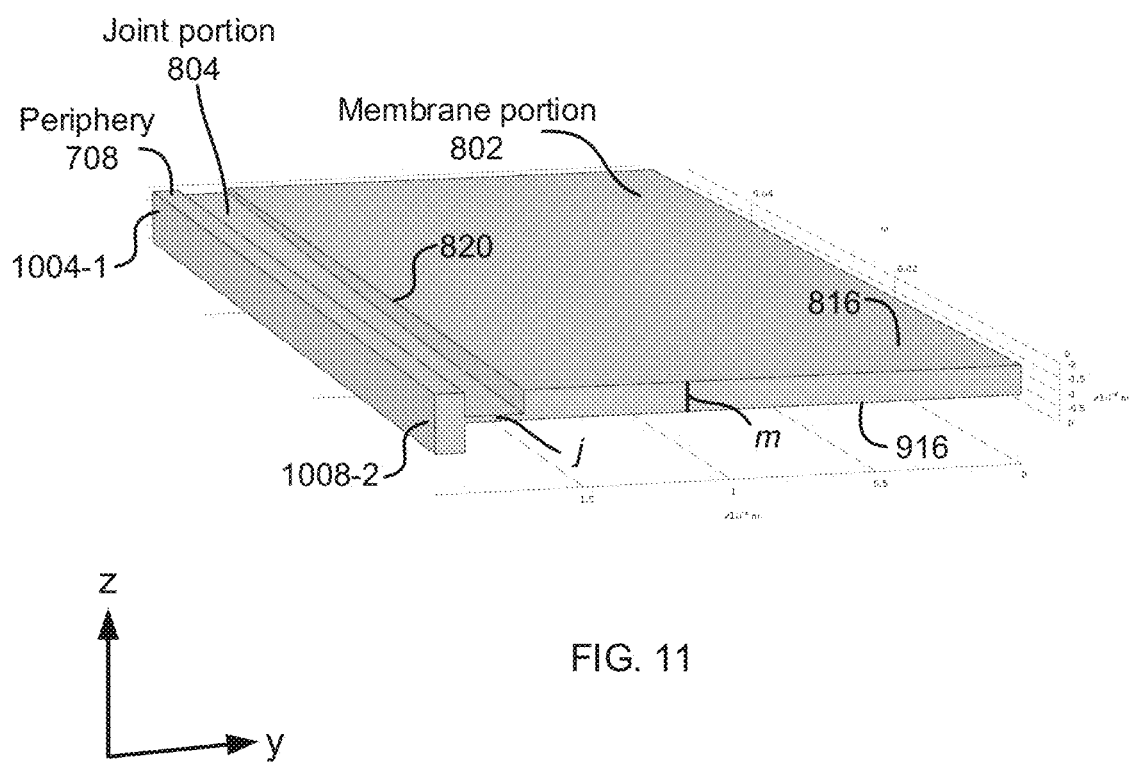
FIG. 11 is an isometric view of an embodiment of a liquid lens with a joint, wherein the joint is not flexed.

FIG. 11 is an isometric view of a portion of an embodiment of a liquid lens having a joint portion 804, wherein the joint portion 804 is not flexed. The thickness j of the joint portion 804 varies. In some embodiments, the thickness j has a variation of at least 20% (e.g., 30%, 40%). In some embodiments, thickness j at the edge 1008 is between 20% and 80% or 20% and 40% of thickness j at the corner 1004. In some embodiments, a first thickness j1 of the joint portion 804 at the edge 1008 is less than a second thickness j2 of the joint portion 804 at the corner 1004. The first thickness j1 is between 10% and 60% of the second thickness j2.

Figure 12:
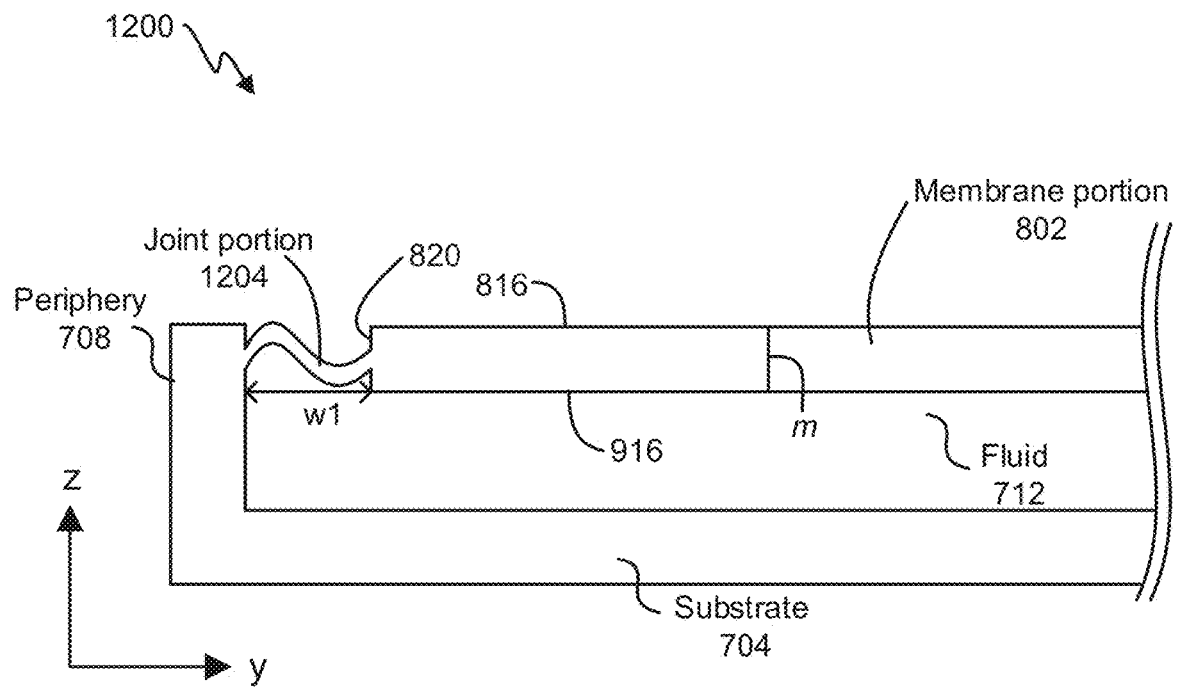
FIG. 12 illustrates a cross section of an embodiment of a jointed lens that allows vertical translation of a membrane portion of a liquid lens.

FIG. 12 illustrates a cross section of an embodiment of a jointed lens 1200 that allows vertical translation of the membrane portion 802. The jointed lens 1200 comprises a membrane portion 802, a periphery 708, a substrate 704, and a joint portion 1204. The joint portion 1204 is distinguished from the membrane portion 802 by a discontinuity 820. Fluid 712 fills a space between the membrane portion 802 and the substrate 704. The periphery 708 confines and/or circumscribes the fluid 712 in one or more lateral directions.

The membrane portion 802 is in a neutral position (e.g., flat, because the fluid 712 doesn't push the membrane portion 802 to flex, or to reduce pressure from the membrane portion 802 so that the membrane portion 802 "sags" toward the substrate 704.

The joint portion 1204 has a serpentine curve in the cross section. The joint portion 1204 has a first width w1, measured from the membrane portion 802 to the periphery 708 in the neutral position. A path along the serpentine curve is longer than the first width w1. The joint portion 1204 has a thickness less than a thickness m of the membrane portion 802. The discontinuity 820 defines the end of the membrane portion 802. In some embodiments, the joint portion 1204 is formed by thinning the membrane 616 (e.g., which also forms the discontinuity 820 to distinguish the membrane portion 802 from the joint portion 1204). The thickness of the joint portion 1204 is centered on the end of the membrane portion 802 (e.g., to minimize distortion). In some embodiments, the joint portion 1204 has a shape other than serpentine (e.g., a cross section that is triangular and/or square).

Figure 13:
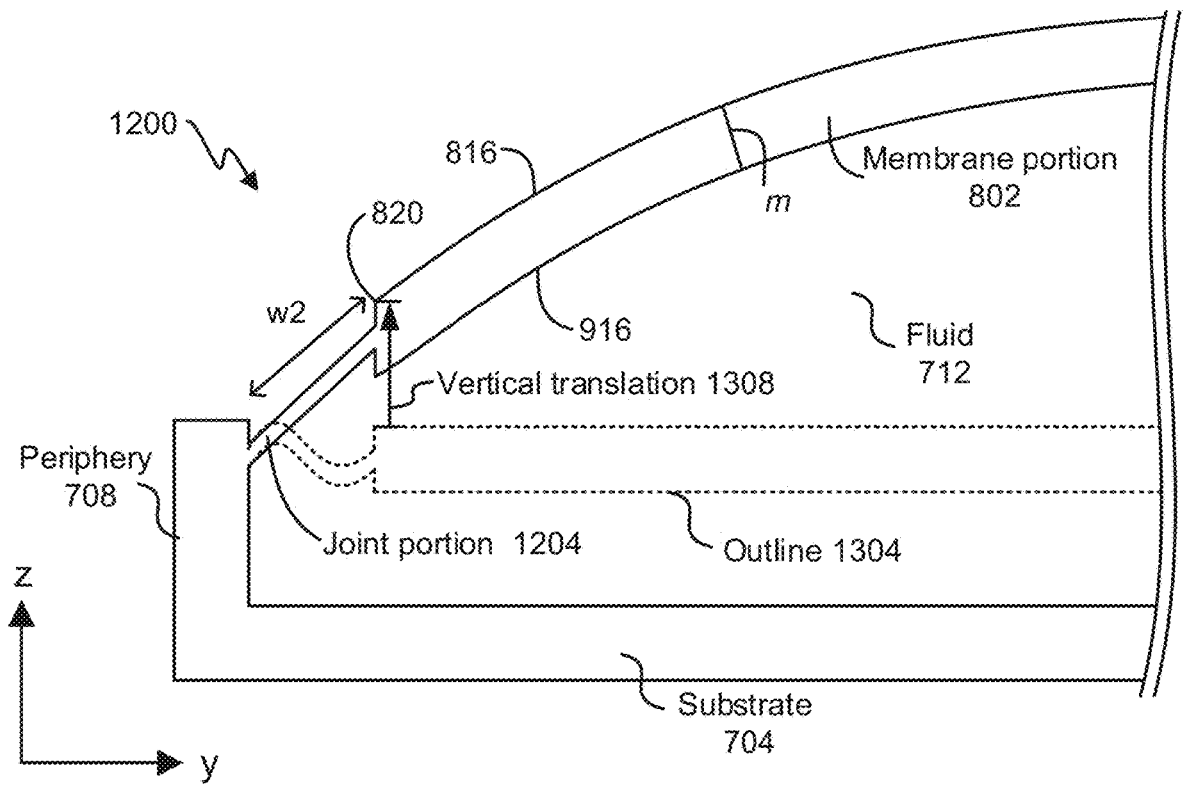
FIG. 13 illustrates the cross section of an embodiment of the jointed lens with the membrane portion in a flexed position.

FIG. 13 illustrates the cross section of an embodiment of the jointed lens 1200 with the membrane portion 802 in a flexed position. The membrane portion 802 is in the flexed position because pressure is increased to the fluid 712. The flexed position corresponds to a higher optical power, shorter focal length of the jointed lens 1200. An outline 1304 shows a position of the membrane portion 802 and the joint portion 1204 in the neutral position from FIG. 12 for reference. The joint portion 1204 is configured to allow for a vertical translation 1308 of the end of the membrane portion 802 with respect to the periphery 708. Vertical is defined in a direction of beam propagation (e.g., parallel to the z-axis), regardless of an orientation of the liquid lens while worn by a user. In some embodiments, vertical is defined while the substrate 704 is placed horizontally so that the direction of beam propagation of the lens aligns with the force of gravity. The vertical component of the translational motion helps to reduce optical distortion as the liquid lens changes shape to increase/decrease optical power while the end of the membrane portion is attached to a non-elliptical frame/periphery 708. Vertical movement of the membrane portion 802 can minimize lateral forces on the membrane portion 802. The jointed lens 900 in FIG. 8 allows for pivotal motion of an end of the membrane portion 802 with respect to the periphery 708; and the joint portion 1204 of the jointed lens 1200 in configured to allow translation motion of the membrane portion 802 with respect to the periphery 708 (e.g., vertical translation of the end of the membrane portion 802).

In some embodiments, the joint portion 1204 is defined by a second width w2 in the flexed position. The second width w2 is greater than a first width w1. The membrane portion 802 thickness m remains constant (e.g., within +/−10%). The serpentine-shape of the joint portion 1204 is not present in the flexed position. The joint portion 1204 expands (width of joint portion 1204 increases) and contracts (width of joint portion 1204 decreases) for different optical powers of the jointed lens 1200. The width of the joint portion 1204 increases for higher optical power, shorter focal length as compared to the neutral position of FIG. 12.

Figure 14:
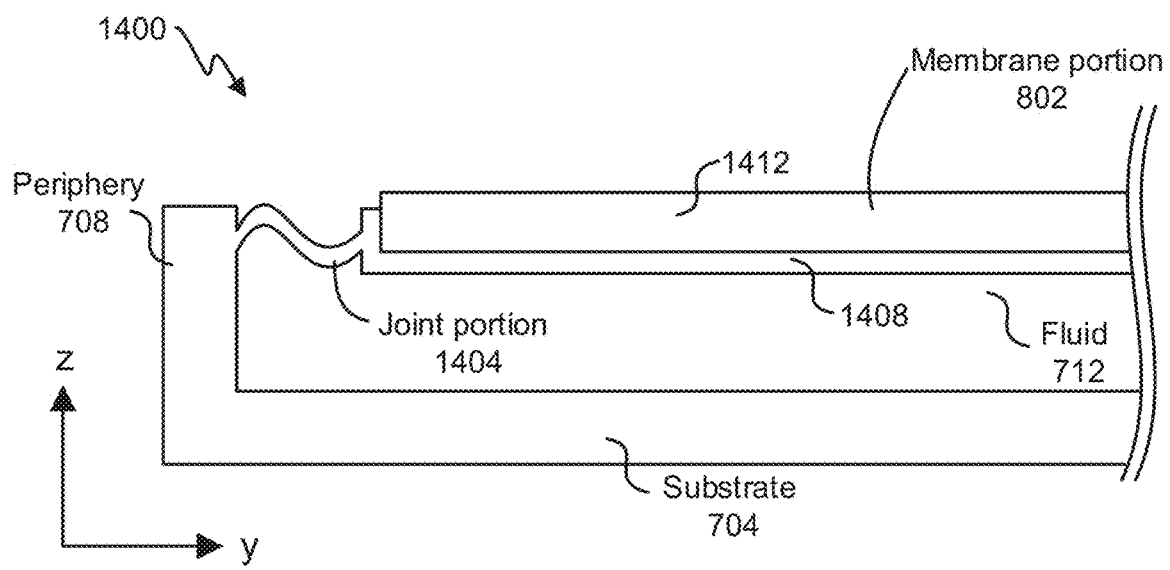
FIG. 14 illustrates a cross section of an embodiment of a liquid lens, wherein a joint portion is made of a different material than the membrane portion.

FIG. 14 illustrates a cross section of an embodiment of a jointed lens 1400, wherein a joint portion 1404 is made of a different material than the membrane portion 802. The joint portion 1404 is made of a first material 1408. The membrane portion 802 is made of a second material 1412. The first material 1408 is not the same as the second material 1412. In some embodiments, the first material 1408 keeps the fluid 712 from contacting the membrane portion 802. In some embodiments, the joint portion 1404 is opaque (not transparent) and/or does not extend completely underneath the membrane portion 802 (e.g., forms an aperture under the membrane portion 802). In some embodiments, the first material 1408 is a metal.

Figure 15:
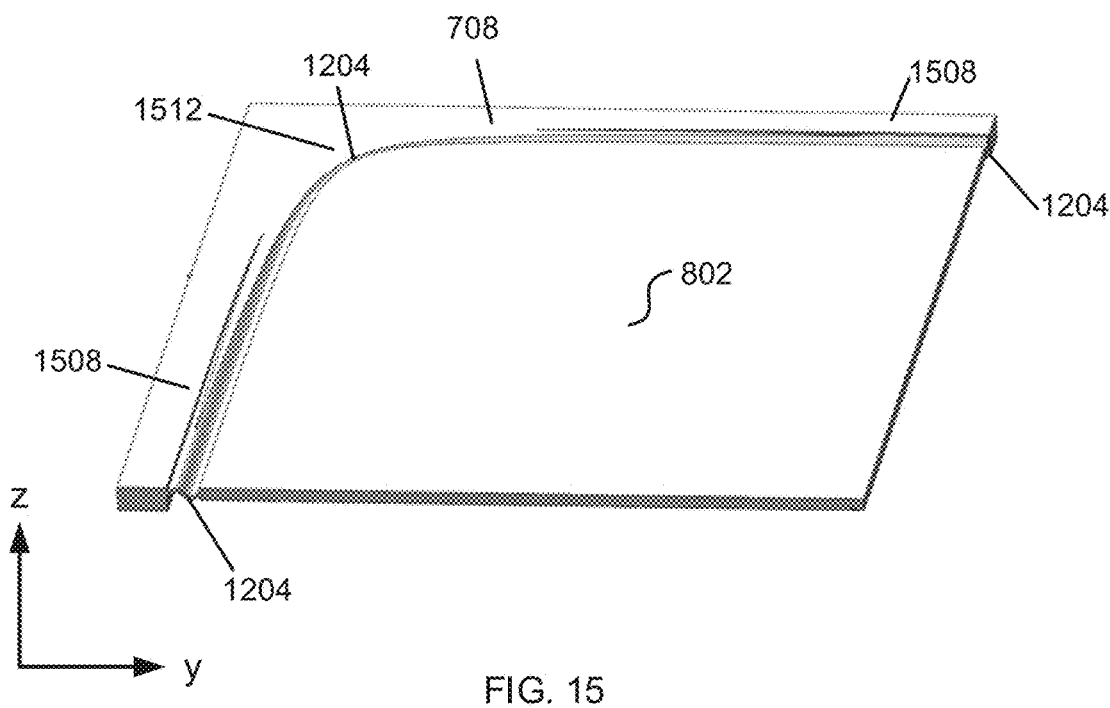
FIG. 15 is an isometric view showing an embodiment of the joint portion being thinner near an edge of the periphery and thicker near a corner of the periphery.

FIG. 15 is an isometric view showing an embodiment of the joint portion 1204 being thinner and/or changing shape near an edge 1508 of the periphery 708 and/or thicker near a corner 1512 of the periphery 708. For example, the joint portion 1204 could have a less dramatic serpentine shape and/or a partial serpentine shape near the corner 1512 and/or a full or more (e.g., multiple periods) of serpentine shapes near the edge 1508. The joint portion 1204 is configured to allow more vertical translation 1308 near the edge 1508 than the corner 1512 of the periphery 708. This allows the membrane portion 802 liftoff more near the edge 1508. Thus if the periphery 708, the joint portion 1204, and/or the end of the membrane portion 802 have a non-elliptical shape (e.g., shape in the x/y plane similar to FIG. 10), then the membrane portion 802 can still take the shape of a spherical lens. Non-elliptical would include non-circular as a special case as non-elliptical.

The joint portion 1204 flexes to allow the membrane portion to more closely mimic a spherical shape in the direction of beam propagation (z direction). The joint portion 1204 is configured to allow vertical translation of the membrane portion 802 while still allowing the liquid lens to resist gravity and/or inertial effects. Thus a rectangular lens (e.g., rectangular periphery 708 in the x/y plane) can support a spherical membrane portion 802. Put another way, the joint portion 1204 changes z dimension of the end of the membrane portion 802 around the periphery of the lens to match a spherical lens. This may be desired in order to improve lens surface accuracy.

Figure 16:
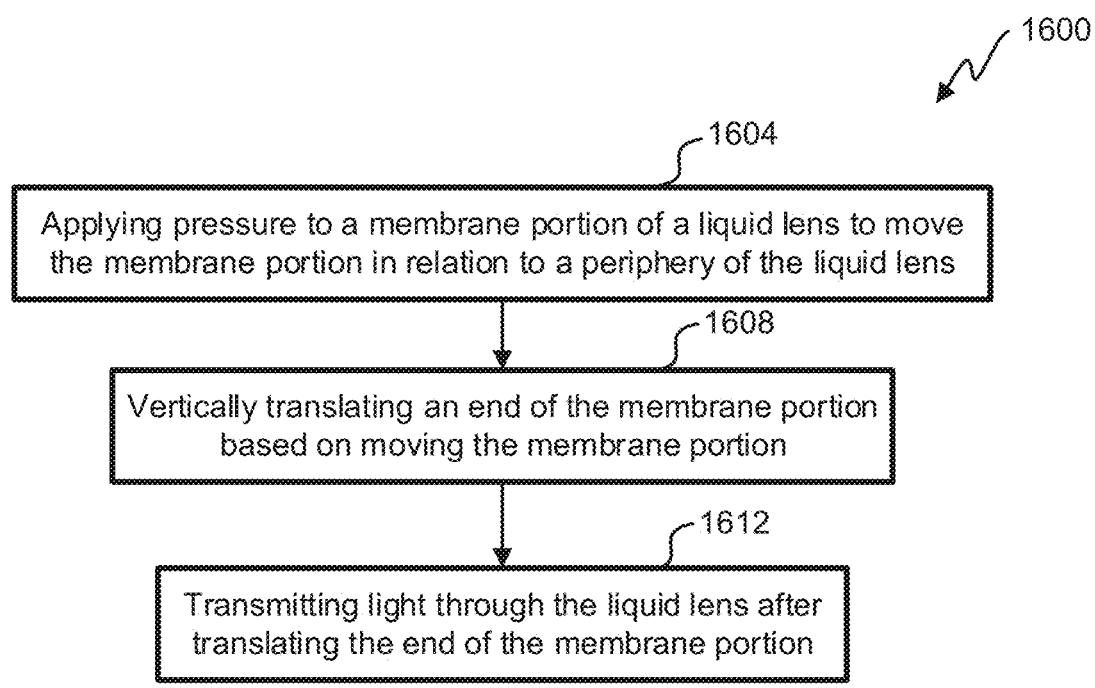
FIG. 16 illustrates an embodiment of a flowchart of a process for using a liquid lens with vertical translation.

FIG. 16 illustrates an embodiment of a flowchart of a process 1600 for using a liquid lens with vertical translation. Process 1600 begins in step 1604 with applying pressure to a membrane portion 802 of a liquid lens (e.g., using fluid 712) to move the membrane portion 802 in relation to a periphery 708 of the liquid lens. Vertically translating an end of the membrane portion 802 in a translation motion relative to the periphery 708 using the joint portion 1204 based on applying pressure to the membrane portion 802, step 1608. In step 1612, light is transmitted through membrane portion 802 of the liquid lens after vertically translating the end of the membrane portion 802 in relation to the periphery 708, wherein beam effect is reduced compared to a liquid lens without a joint. In some embodiments, the method comprises transmitting light through the liquid lens before step 1604, wherein light transmitted through the liquid lens is focused differently in step 1612 than light transmitted through the liquid lens before step 1604 (e.g., the lens was in a neutral position, FIG. 12, before step 1604).

In some embodiments, the method further comprises moving the membrane portion 802 from a neutral position (e.g., FIG. 12) to decrease a focal length of the liquid lens (e.g., FIG. 13), and/or increasing a width of the joint portion 1204 (e.g., to w2) based on moving the membrane portion 802 from the neutral position to decrease the focal length of the liquid lens.

In some embodiments, the joint portion is made from a different polymer than the membrane portion, where the polymer making up the joint portion has a lower modulus than the polymer making up the membrane portion. The membrane portion may be coated with another material, including silicone, polyurethane, and natural rubber to increase the membrane portion flexural stiffness relative to the joint portion.

FIG. 17 illustrates a cross section of an embodiment of a jointed lens 1700. The jointed lens 1700 comprises a membrane portion 1702, a bottom plate 1704, a joint portion 1706, a periphery 1708, and fluid 1712. The periphery 1708 circumscribes the fluid 1712 to confine the fluid 1712 within a shape of the periphery 1708 (e.g., the periphery 1708 confines the fluid 1712 within the shape, wherein the shape is defined in an x/y plane). The membrane portion 1702, the joint portion 1706, and the periphery 1708 are part of a membrane 1716. The jointed lens 1700 comprises a driver plate 1720. The membrane 1716 is curved to attach to the bottom plate 1704. The bottom plate 1704 is considered a substrate in some embodiments. An upper portion 1728 of the membrane 1716 contacts and the driver plate 1720, and a lower portion 1724 of the membrane 1716 contacts the bottom plate 1704. The periphery 1708 is between the upper portion 1728 of the membrane 1716 and the lower portion 1724 of the membrane 1716. "Upper" and "lower" are used to distinguish portions of the membrane 1716 and do not necessarily indicate orientation of the jointed lens 1700. The joint portion 1706 is between the membrane portion 1702 and the upper portion 1728. A discontinuity 1732 distinguishes the membrane portion 1702 from the joint portion 1706. The joint portion 1706 is thinner than the membrane portion 1702. The joint portion 1706 couples the membrane portion 1702 with the periphery 1708 (e.g., in some embodiments, the upper portion 1728 and/or the lower portion 1724 are considered part of the periphery 1708; or the joint portion 1706 couples the membrane portion 1702 with the periphery 1708 via the upper portion 1728.

FIG. 18 illustrates the jointed lens 1700 with the driver plate 1720 and/or the bottom plate 1704 compressed. The driver plate 1720 is moved closer to the bottom plate 1704 than in FIG. 17. As the driver plate 1720 is driven toward the bottom plate 1704, the upper portion 1728 of the membrane 1716 is moved toward the lower portion 1724 of the membrane 1716, which pushes fluid 1712 away from the periphery 1708. Fluid 1712 moving away from the periphery 1708 exerts an increased force on the membrane portion 1702, which increases optical power of the jointed lens 1700. The joint portion 1706 is flexible and/or allows the membrane portion 1702 to move in the z direction and/or rotate with respect to the periphery 1708, which can help minimize the beam effect. In some embodiments, the joint portion 1706 is a portion of the membrane 1716 between the discontinuity 1732 and a portion of the membrane 1716 under and/or in contact with the driver plate 1720. The joint portion 1706 allows the membrane portion 1702 to move with respect to periphery 1708.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A device for use as a liquid lens, the device comprising:
   a substrate;
   a membrane portion, wherein the membrane portion is flexible;
   a fluid filling a gap between the substrate and the membrane portion;
   a periphery confining the fluid within a shape of the periphery; and
   a joint portion, wherein:
      the joint portion couples the membrane portion with the periphery;
      the joint portion is configured to allow an end of the membrane portion adjacent to the joint portion to move in a translation motion in relation to the periphery; and
      the end of the membrane portion is defined by a discontinuity in a surface of the membrane portion.

2. The device of claim 1, wherein the joint portion is thinner than the membrane portion and has a serpentine cross section.

3. The device of claim 1, wherein:
   the translation motion is a vertical motion, and
   vertical is defined in a direction of beam propagation.

4. The device of claim 1, wherein the joint portion is made of a same material as the membrane portion.

5. The device of claim 1, wherein the joint portion comprises a metal.

6. The device of claim 1, wherein the joint portion follows the shape of the periphery.

7. The device of claim 1, wherein the end of the membrane portion has a non-elliptical shape in a plane orthogonal to beam propagation.

8. The device of claim 1, wherein the shape of the periphery is non-elliptical.

9. The device of claim 1, wherein the shape of the periphery includes an edge and a corner.

10. The device of claim 9, wherein:
    the edge of the periphery is defined by a first radius of curvature,
    the corner of the periphery is defined by a second radius of curvature, and
    the first radius of curvature is at least four times the second radius of curvature.

11. The device of claim 10, wherein a first thickness of the joint portion at the edge is less than a second thickness of the joint portion at the corner.

12. The device of claim 10, wherein:
    the joint portion has a width defined by a distance from the membrane portion to the periphery, and
    the width of the joint portion increases as the membrane portion moves in relation to the periphery.

13. A method of using a liquid lens, the method comprising:
    applying pressure to a membrane portion of the liquid lens to move the membrane portion in relation to a periphery of the liquid lens, wherein the liquid lens comprises:
       a substrate;
       the membrane portion, wherein the membrane portion is flexible;
       a fluid filling a gap between the substrate and the membrane portion;
       the periphery confining the fluid within a shape of the periphery; and
       a joint portion, wherein:
          the joint portion couples the membrane portion with the periphery;
          the joint portion is configured to allow an end of the membrane portion adjacent to the joint portion to move in relation to the periphery; and
          the end of the membrane portion is defined by a discontinuity in a surface of the membrane portion;
    moving the end of the membrane portion in a translation motion relative to the periphery using the joint portion based on applying pressure to the membrane portion; and
    transmitting light through the liquid lens after translating the end of the membrane portion, whereby beam effect is reduced compared to a liquid lens without a joint.

14. The method of claim 13, further comprising:
    moving the membrane portion from a neutral position to decrease a focal length of the liquid lens, and
    increasing a width of the joint portion based on moving the membrane portion from the neutral position to decrease the focal length of the liquid lens.

15. The method of claim 13, wherein there is less translation of the end of the membrane portion near a corner of the periphery than at an edge of the periphery because a thickness of the joint portion at the corner of the periphery is greater than the thickness of the joint portion at the edge of the periphery.

16. The method of claim 13, wherein:
    the joint portion follows the shape of the periphery, and
    the shape of the periphery is non-elliptical.

17. A system comprising:
    a frame;
    a display mounted in the frame;
    a waveguide in the display; and
    a liquid lens configured to change focus of light exiting the waveguide, the liquid lens comprising:
       a substrate;
       a membrane portion, wherein the membrane portion is flexible;
       a fluid filling a gap between the substrate and the membrane portion;

a periphery confining the fluid within a shape of the periphery; and a joint portion, wherein:
the joint portion couples the membrane portion with the periphery;
the joint portion is configured to allow an end of the membrane portion adjacent to the joint portion to move in a translation motion in relation to the periphery; and
the end of the membrane portion is defined by a discontinuity in a surface of the membrane portion.

18. The system as recited in claim 17, wherein:
the liquid lens is a first liquid lens, and
the system further comprises a second liquid lens, and
the second liquid lens is configured to counteract effects of the first liquid lens for an object imaged on an opposite side of the display in relation to a user's eye.

19. The system as recited in claim 17, wherein the joint portion follows the shape of the periphery.

20. The system as recited in claim 17, wherein the shape of the periphery is non-elliptical.

\* \* \* \* \*